Jan. 4, 1938.　　F. F. RUTHVEN　　2,104,103
DEGREASING APPARATUS
Original Filed May 4, 1935　　2 Sheets-Sheet 1
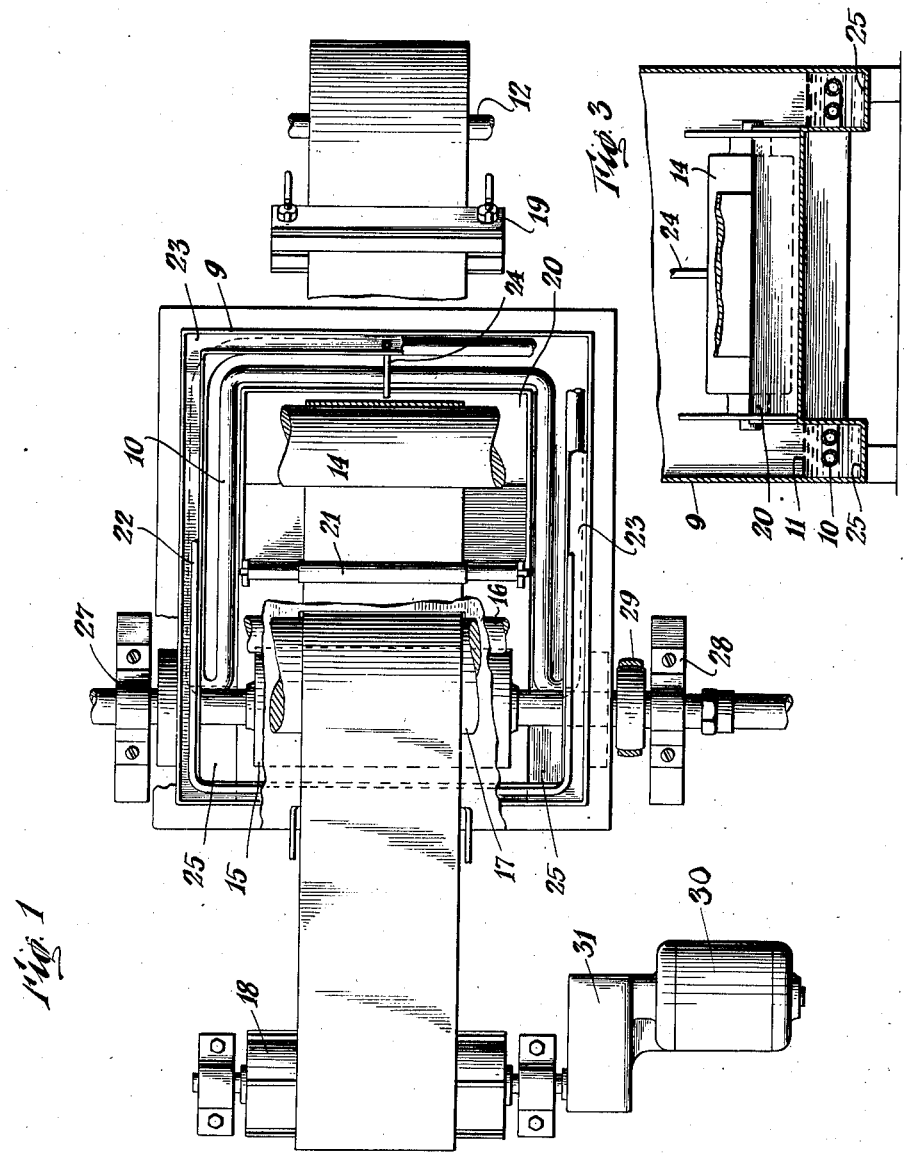
INVENTOR
Frederick Francis Ruthven
BY
Cooper, Kerr + Dunham
ATTORNEYS

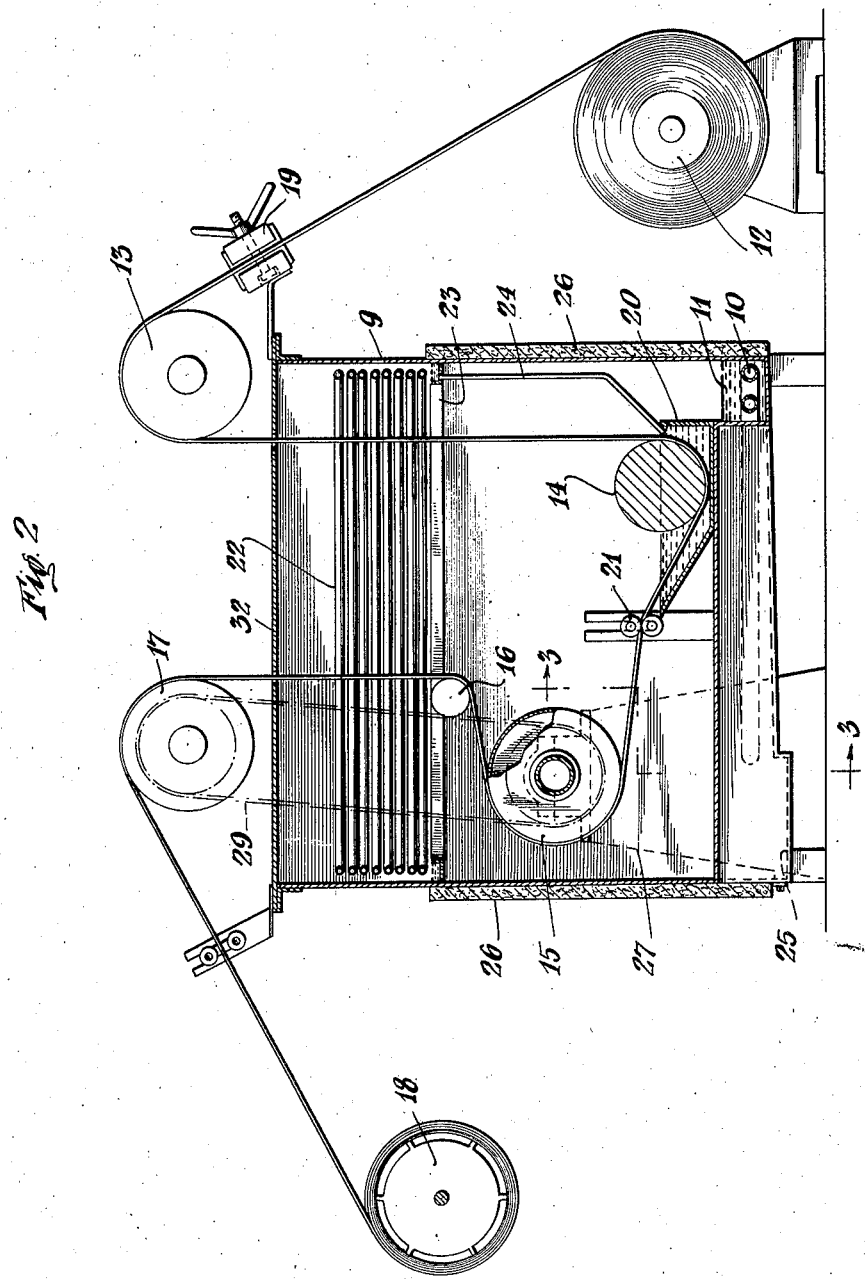

Patented Jan. 4, 1938

2,104,103

UNITED STATES PATENT OFFICE 2,104,103

DEGREASING APPARATUS

Frederick Francis Ruthven, Toronto, Ontario, Canada, assignor, by mesne assignments, to Aluminium Laboratories Limited, Montreal, Quebec, Canada, a corporation of Canada Original application May 4, 1935, Serial No. 19,869. Divided and this application October 8, 1935, Serial No. 44,075

9 Claims. (Cl. 87—6)

This invention relates to method and apparatus for degreasing articles and various goods such as have become soiled in their manufacture, and require cleaning prior to further processing as for plating, galvanizing, lacquering, brass-finishing, and for all other treatments for which the surface of articles must be free from grease, oils, waxes, resins, and foreign accumulation adhering to such articles because of the presence of such materials. Solvents of the kind suitable for degreasing include trichlorethylene, ethylene dichloride, carbon tetrachloride, tetrachlorethylene and mixtures thereof, and other substances selectable in accordance with the properties of the articles to be cleaned and the character of the materials to be dissolved, and in keeping with common practice I shall refer to the results obtainable by the methods of the present invention as degreasing irrespective of the particular classification of the materials removed so long as they are soluble in the kinds of solvents which are usable in commercial practice for cleaning purposes, as for example, the solvents referred to hereinabove. With this understanding, my invention relates more particularly to the degreasing of articles which have sufficient heat capacity to maintain a temperature at least as high as the vapor temperature of the solvent for a period of time sufficiently long to enable the withdrawal of the articles from a vapor atmosphere of the solvent, degreased and clean, after having passed through hot solvent.

It is among the objects of the invention to provide apparatus whereby articles may be completely degreased in less elapsed time than heretofore attainable, and to assure freedom of solvent on the degreased articles.

Other and more detailed advantages and objects will appear more fully in the accompanying description and claims and from the annexed drawings in which is shown an apparatus employing the principle underlying the present invention and designed for the degreasing of metallic sheet material.

In the drawings:—

Fig. 1 is a plan of apparatus for degreasing metallic sheet material.

Fig. 2 is a longitudinal section of the apparatus, and

Fig. 3 is a section on line 3—3 of Fig. 2.

A common practice heretofore employed for degreasing metallic products in course of manufacture has been to immerse such products in a bath of boiling solvent, such as trichlorethylene, and then in a vapor atmosphere of the solvent for a sufficient period of time to dry the products. For this purpose articles may be handled in bulk in wire containers or passed through the solvent and vapor mediums on chain conveyors. This procedure has served satisfactorily so long as time was not of the essence, but with limited space or for the treatment of articles which require very little handling, as, for example, coiled sheet metal, foil, cable, wire, etc., it is desirable to accomplish degreasing as rapidly and as economically as possible. My invention contemplates applying heat to the article being treated, either prior or subsequent to its immersion in the cleaning solvent, at such a rate and in such quantity that the article will attain a temperature of at least the vapor temperature of the solvent after the article leaves the bath of boiling solvent so that the article is devoid of a film of solvent as well as of greasy material when it leaves the vapor atmosphere.

While the apparatus illustrated may be adapted to convey baskets of individual articles through the degreasing process, in its present form it is particularly suited for the rapid degreasing of metallic sheet material.

In its main features it consists of a tank or container 9 which is provided with a heating coil 10 near its bottom for heating the solvent 11.

A coil of sheet material to be cleaned is mounted upon a supply spool or spindle 12 and the sheet is guided over the guide roll 13, into the tank and under bath roll 14, to heated roll 15, idler 16, and over roll 17 to a rewind drum 18. The sheet is advanced over the rolls by the application of driving power to the rewind drum 18 so that the sheet is maintained under tension as it passes through the apparatus. A squeegee 19 with felt-covered surfaces may be used for maintaining tautness in the sheet throughout its course of travel in the tank.

Bath roll 14 is partly immersed in hot condensate contained within a pan 20 so that the sheet will be thoroughly washed in the hot condensate as it passes under the roll. If desired, a pair of buffer rolls 21 may be provided beyond the exit edge of the pan to remove excess solution. The coil 10 may be heated by passing steam therethrough, and the heat given up by the coils keeps the solvent at the bottom of the tank in ebullition and causes continuous vaporization. All of the space above the boiling solvent up to coils 22 is filled with solvent vapor so that heated roll 15 is immersed in a vapor atmosphere. The cooling coils which are in the upper portion of the tank prevent loss of vapor from the tank. These cooling coils are mounted around the inside of the wall of the tank and cold water is supplied thereto for producing the cooling effect desired. The vapor line in the tank is in the vicinity of the lower tiers of the cooling coils.

The vapor which comes in contact with the cooling coils condenses and collects in a gutter 23 just below the coils. This gutter is a source of supply of condensate of pure solvent for the liquid solvent bath in pan 20 in which roll 14 depends. A pipe 24 serves to conduct the condensate from the gutter to the bath. The pan is continually receiving distilled solvent and the greasy or otherwise dirty solvent is overflown from the pan and is collected in the sump 25 at the bottom of the tank from whence it may be manually removed when the apparatus is not in operation.

Preferably the outer wall of the tank is insulated as at 26 up to the cooling section of the tank so as to preserve vapor conditions in the vapor bath. Under ordinary conditions there will be no overflow of vapor from within the tank but a cover 32 may be used to prevent the wafting away of vapor by air disturbances on the outside of the tank.

The roll 15 is heated by any suitable means as by passing steam therethrough, or by gas or electricity, and the temperature of the roll should be maintained such as to heat the sheet sufficiently to prevent the condensation of the vapor upon the sheet before it leaves the apparatus. The heat provided by the heated roll produces a condition of superheated vapor in the vicinity of the heated roll. Such factors as the specific heat of the material being degreased, the quantity or thickness of the material, the desired rate of passage of the material through the vapor atmosphere, as well as the vapor temperature of the solvent should be considered in determining the temperature to which the heated roll must be heated. For degreasing sheet aluminum by the use of trichlorethylene I have been able to increase the rate of degreasing very materially with the temperature of the steam in the heated roll at about 350° F.

The heated roll is mounted upon bearings 27, 28 which are preferably disposed outside of the tank. The heated roll may be made of any suitable material and I have obtained satisfactory results in degreasing sheet aluminum with an iron roll. Especially when the surface of the roll is of harder material than that of the sheet it should have a polished surface and be driven. In the apparatus illustrated the roll is driven by a belt connection 29 with roll 17 so that its rotation is not dependent upon the passing metallic sheet. Other driving arrangements may be made as by placing the driving motor 30 and change speed mechanism 31 to drive roll 17 and utilizing a belt to drive rewind drum 18.

The method of my invention enables a considerable increase in the rate of travel of the sheet through the apparatus. The best operating speed heretofore obtainable without excessive loss of solvent can be exceeded many times without carrying over any solvent with the sheet being cleaned.

While I have disclosed a preferred form of apparatus by which my method may be utilized for degreasing sheet material, it is to be noted that an important feature of my method is in providing heat in sufficient quantity to the article being cleaned to prevent such cooling of the article as to permit condensation on the article before it leaves the vapor atmosphere. In addition to the described manner of applying heat, I have obtained satisfactory results in cleaning sheet aluminum by heating it before its entrance into the tank. For articles other than those which may be wound upon a drum and which may be heated by means of a roller, other provision may be made for heating the articles before entering the degreasing apparatus. For example, castings requiring to be degreased prior to plating may be passed through a tunnel furnace which would impart to them enough heat for them to emerge from the degreasing apparatus at a temperature hotter than the solvent vapor.

It should be noted that if the sheet or other article to be degreased is cold as it enters the apparatus, the hot vapor will condense on the article before it reaches the bath of hot solvent. This will produce a flushing action of liquid and improved cleaning conditions. Because of this it is considered preferable to heat the sheet or other article after it enters the vapor atmosphere in the degreasing apparatus.

I claim:

1. Degreasing apparatus of the class described, comprising a container for solvent, means for continuously vaporizing and condensing solvent contained in the bottom of said container, a solvent bath removed from the solvent in the bottom of said container and containing condensed solvent, cooling surfaces at the upper portion of said container for condensing solvent vapor, means for conducting condensed vapor to said solvent bath, and means for guiding sheet material into and out of said container and through said solvent bath, said means including a roller depending into said solvent bath and a heating roller in the vapor atmosphere above the solvent contained in the bottom of said container.

2. Degreasing apparatus of the class described, comprising a container for solvent, said container having a liquid zone in the bottom thereof and a vapor zone above the liquid zone, a solvent bath within said container, a roller depending into said bath for immersing sheet material therein as the sheet material passes under the roller, a heating roll in the vapor zone of said container, said heating roll being hollow and supported on bearings outside of said container, means for guiding the sheet material onto said roller and said heating roll, said means including a guide roll outside of said container, means for drawing said sheet material from said guide roll and thereby rotating said guide roll, and means driven by said guide roll for rotating said heating roll independently of the sheet material passing therebetween.

3. Degreasing apparatus of the class described comprising a container for solvent, a sump in said container for said solvent, means in said sump for heating and vaporizing the solvent therein to create a vapor bath, within said container above the solvent in said sump, cooling surfaces for condensing the vaporized solvent in the upper portion of said container, a pan for containing condensed solvent separate from said sump, said pan being located in the lower portion of said container, and means for guiding sheet material into and out of said container and through the solvent in said pan, said last named means including a heated roll positioned within said vapor bath for heating said sheet material above the temperature of said vapor bath before the sheet material leaves said vapor bath.

4. Degreasing apparatus of the class described comprising a container for a liquid bath of solvent in the lower portion of the container, a sump separated from said liquid bath for collecting solvent overflowing from said liquid bath, means for vaporizing the solvent in said sump to create a vapor bath within said container above the liquid in said sump, cooling surfaces for condensing vaporized solvent in the upper portion of said container, means for conducting sheet material into and out of said container and through the condensing zone in the upper portion thereof and said liquid and vapor solvent baths, and means within said vapor bath for heating said sheet material to a temperature in excess of said vapor bath.

5. Degreasing apparatus of the class described comprising a container open at its upper portion for permitting the ingress and egress of material to be cleaned, said container being adapted to contain liquid solvent in the bottom thereof, means for heating said liquid solvent for vaporizing the same to provide a vapor bath above the liquid in the bottom of said container, a pan within said container and adapted to contain solvent, means for immersing the material to be cleaned in the solvent in said pan, means within said vapor bath for applying heat to said material to be cleaned to attain a temperature of said material in excess of the temperature of the said vapor bath, and means for guiding the material to and from said immersing and heat applying means and from said vapor bath and container.

6. Degreasing apparatus of the class described comprising a container adapted to contain a liquid solvent bath in the bottom thereof and a vapor solvent bath above said liquid solvent bath, means within said vapor bath for applying heat to material to be cleaned to attain a temperature of said material in excess of the temperature of said vapor bath, and means for conveying material to be cleaned to and from said heat applying means and through said liquid bath and said vapor bath.

7. Degreasing apparatus of the class described comprising a container open at its upper portion for permitting the ingress and egress of sheet material to be cleaned, said container being adapted to contain liquid solvent in the bottom thereof, means for heating said liquid solvent for vaporizing the same to provide a vapor bath above the liquid and within said container, and means for guiding the sheet material through said container and the vapor bath therein, said means including a heating roll disposed within said vapor bath for heating the sheet material to be cleaned to a temperature in excess of the temperature of said vapor bath.

8. Degreasing apparatus of the class described comprising a tank for enclosing a vapor bath of solvent, means within said vapor bath for applying heat to material to be cleaned to bring the material to a temperature in excess of the temperature of said vapor bath so that the temperature of the material to be cleaned will be above the temperature of said vapor bath when said material is conveyed from said vapor bath, and means for conveying said material to and from said heat applying means and into and out of said tank and said vapor bath.

9. Degreasing apparatus of the class described comprising a container adapted to contain a liquid solvent in the bottom thereof, means for heating said liquid solvent to create a vapor bath of said solvent within said container and above said liquid solvent, means for applying heat to sheet material while within said vapor bath to raise the temperature of said sheet material above the temperature of said vapor bath, and means for conveying the sheet material to be cleaned to and from said heat applying means and through said vapor bath.

FREDERICK FRANCIS RUTHVEN.